United States Patent
Hanna et al.

(10) Patent No.: US 9,866,092 B2
(45) Date of Patent: Jan. 9, 2018

(54) ROTOR AND METHOD OF FORMING SAME

(71) Applicant: GM GLOBAL TECHNOLOGY OPERATIONS LLC, Detroit, MI (US)

(72) Inventors: Michael D. Hanna, West Bloomfield, MI (US); James G. Schroth, Troy, MI (US); John S. Agapiou, Rochester Hills, MI (US); John C. Morgante, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 906 days.

(21) Appl. No.: 14/281,187

(22) Filed: May 19, 2014

(65) Prior Publication Data
US 2015/0333606 A1  Nov. 19, 2015

(51) Int. Cl.
*H02K 15/02* (2006.01)
*H02K 15/00* (2006.01)
*H02K 17/16* (2006.01)

(52) U.S. Cl.
CPC ..... *H02K 15/0031* (2013.01); *H02K 15/0012* (2013.01); *H02K 15/024* (2013.01); *H02K 17/165* (2013.01); *Y10T 29/49014* (2015.01)

(58) Field of Classification Search
CPC .......... H02K 15/0012; H02K 15/0031; H02K 15/024; H02K 17/165; Y10T 29/49014
See application file for complete search history.

(56) References Cited

U.S. PATENT DOCUMENTS

| 2,876,371 | A | * | 3/1959 | Wesolowski | H02K 1/16 29/609 |
|---|---|---|---|---|---|
| 5,793,145 | A | | 8/1998 | Avakian et al. | |
| 5,886,443 | A | * | 3/1999 | Dymond | H02K 17/165 310/125 |
| 2012/0228985 | A1 | * | 9/2012 | Hayahi | H02K 15/0012 310/211 |
| 2013/0049518 | A1 | | 2/2013 | Kleber et al. | |
| 2015/0333606 | A1 | * | 11/2015 | Hanna | H02K 15/0012 310/211 |
| 2016/0352200 | A1 | * | 12/2016 | Kaneda | B23K 20/12 |

FOREIGN PATENT DOCUMENTS

| CN | 102957272 A | 3/2013 |
|---|---|---|
| CN | 103795195 A | 5/2014 |
| JP | S5899236 A | 6/1983 |
| JP | 410150736 A * | 6/1998 |

OTHER PUBLICATIONS

M.D.Hanna, G.W.Greenwood, "Cavity Growth and Creep in Copper at Low Stresses", Acta metall, vol. 30, pp. 719 to 724, 1982, Pergamon Press Ltd., Great Britain.

* cited by examiner

*Primary Examiner* — Minh Trinh
(74) *Attorney, Agent, or Firm* — Quinn IP Law

(57) ABSTRACT

A method of forming a rotor includes inserting a conductor bar into a slot defined by a lamination stack to define a gap between the conductor bar and the lamination stack. The method further includes, after inserting, swelling the conductor bar within the slot to fill the gap and form the rotor. A rotor is also disclosed.

12 Claims, 5 Drawing Sheets

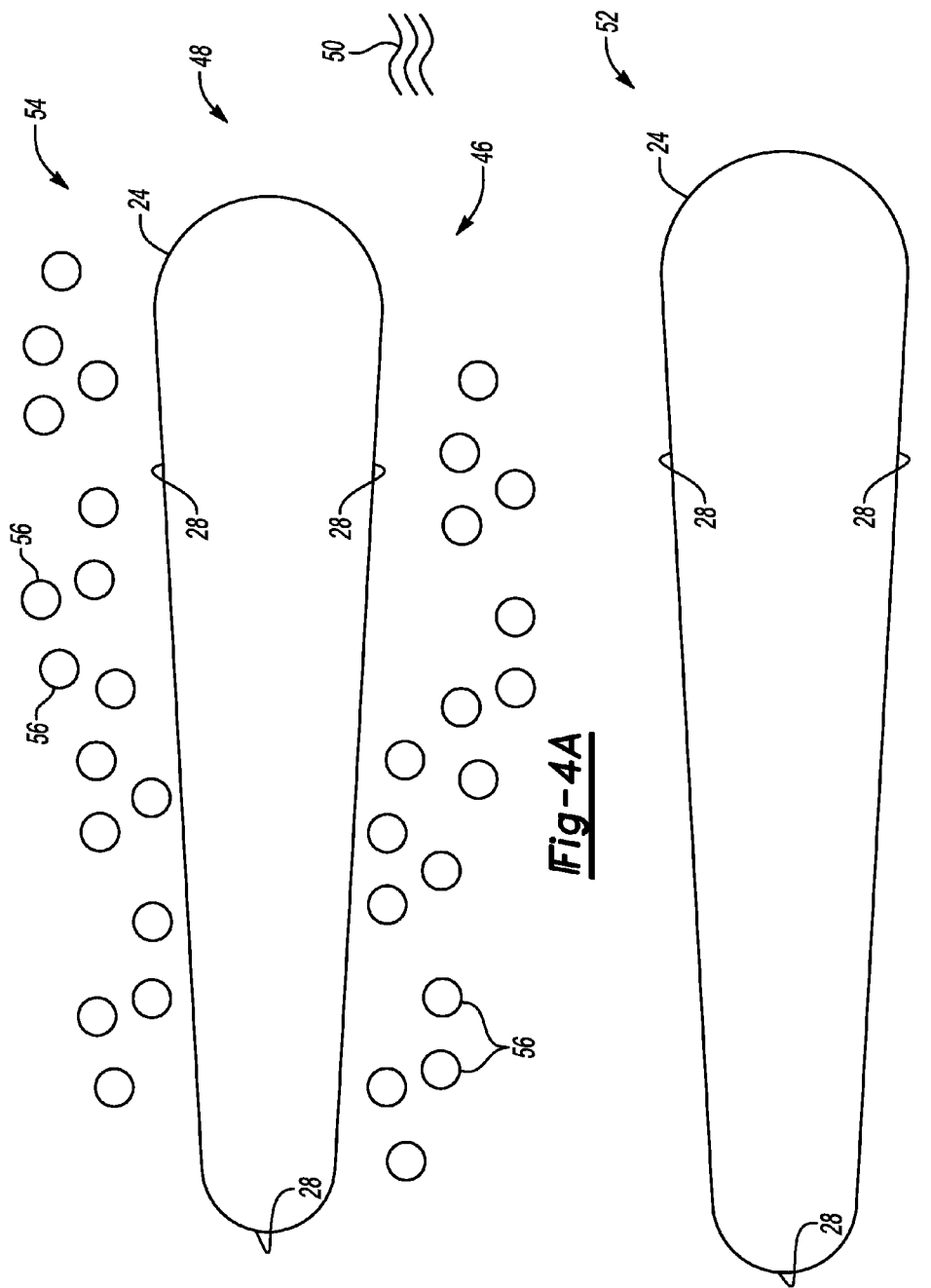

ROTOR AND METHOD OF FORMING SAME

TECHNICAL FIELD

The disclosure relates to a rotor and a method of forming the rotor.

BACKGROUND

Electromagnetic machines such as electric motors, generators, and traction motors are useful for converting energy from one form to another. Such electromagnetic machines often include an element rotatable about an axis. The rotatable element or rotor may be coaxial with a static element or stator, and energy may be converted via relative rotation between the rotor and the stator.

One type of electromagnetic machine, an alternating current induction motor, uses induced current flow to magnetize portions of the rotor during motor operation. More specifically, induced current may flow through conductor bars disposed parallel or nearly parallel to the axis along a periphery of the rotor. Each conductor bar may be electrically connected to every other conductor bar by two shorting rings disposed at opposite ends of the rotor. The shorting rings and conductor bars are subject to inertial forces during rotor operation.

SUMMARY

A method of forming a rotor includes inserting a conductor bar into a slot defined by a lamination stack to define a gap between the conductor bar and the lamination stack. The method further includes, after inserting, swelling the conductor bar within the slot to fill the gap and form the rotor.

In one embodiment, the method includes stacking a plurality of steel laminations adjacent and in contact with one another to form the lamination stack. The lamination stack has a proximal surface and a distal surface spaced apart from the proximal surface, and defines a slot therethrough extending from the proximal surface to the distal surface. The method also includes inserting a conductor bar having an end portion into the slot to define a gap between the conductor bar and the lamination stack. After inserting, the method includes applying a flux material to the end portion, and after applying, pre-heating the flux material. In addition, after inserting, the method includes swelling the conductor bar within the slot to fill the gap and form the rotor.

A rotor includes a lamination stack having a proximal surface and a distal surface spaced apart from the proximal surface, and defines a slot therethrough extending from the proximal surface to the distal surface. The rotor also includes a conductor bar disposed adjacent and in direct contact with the lamination stack within the slot.

As used herein, the terms "a," "an," "the," "at least one," and "one or more" are interchangeable and indicate that at least one of an item is present. A plurality of such items may be present unless the context clearly indicates otherwise. All numerical values of parameters, quantities, or conditions in this disclosure, including the appended claims, are to be understood as being modified in all instances by the term "about" or "approximately" whether or not "about" or "approximately" actually appears before the numerical value. "About" and "approximately" indicate that the stated numerical value allows some slight imprecision (e.g., with some approach to exactness in the value; reasonably close to the value; nearly; essentially). If the imprecision provided by "about" or "approximately" is not otherwise understood with this meaning, then "about" and "approximately" as used herein indicate at least variations that may arise from methods of measuring and using such parameters. Further, the terminology "substantially" also refers to a slight imprecision of a condition (e.g., with some approach to exactness of the condition; approximately or reasonably close to the condition; nearly; essentially). In addition, disclosed numerical ranges include disclosure of all values and further divided ranges within the entire range. Each value within a range and the endpoints of a range are all disclosed as separate embodiments. The terms "comprising," "includes," "including," "has," and "having" are inclusive and therefore specify the presence of stated items, but do not preclude the presence of other items. As used in this disclosure, the term "or" includes any and all combinations of one or more of the listed items.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 4A is a schematic illustration of an end view of one of the plurality of conductor bars of FIG. 3 disposed in an atmosphere including hydrogen;

FIG. 4B is a schematic illustration of an end view of one of the plurality of conductor bars of FIG. 1;

DETAILED DESCRIPTION

Figure 1:
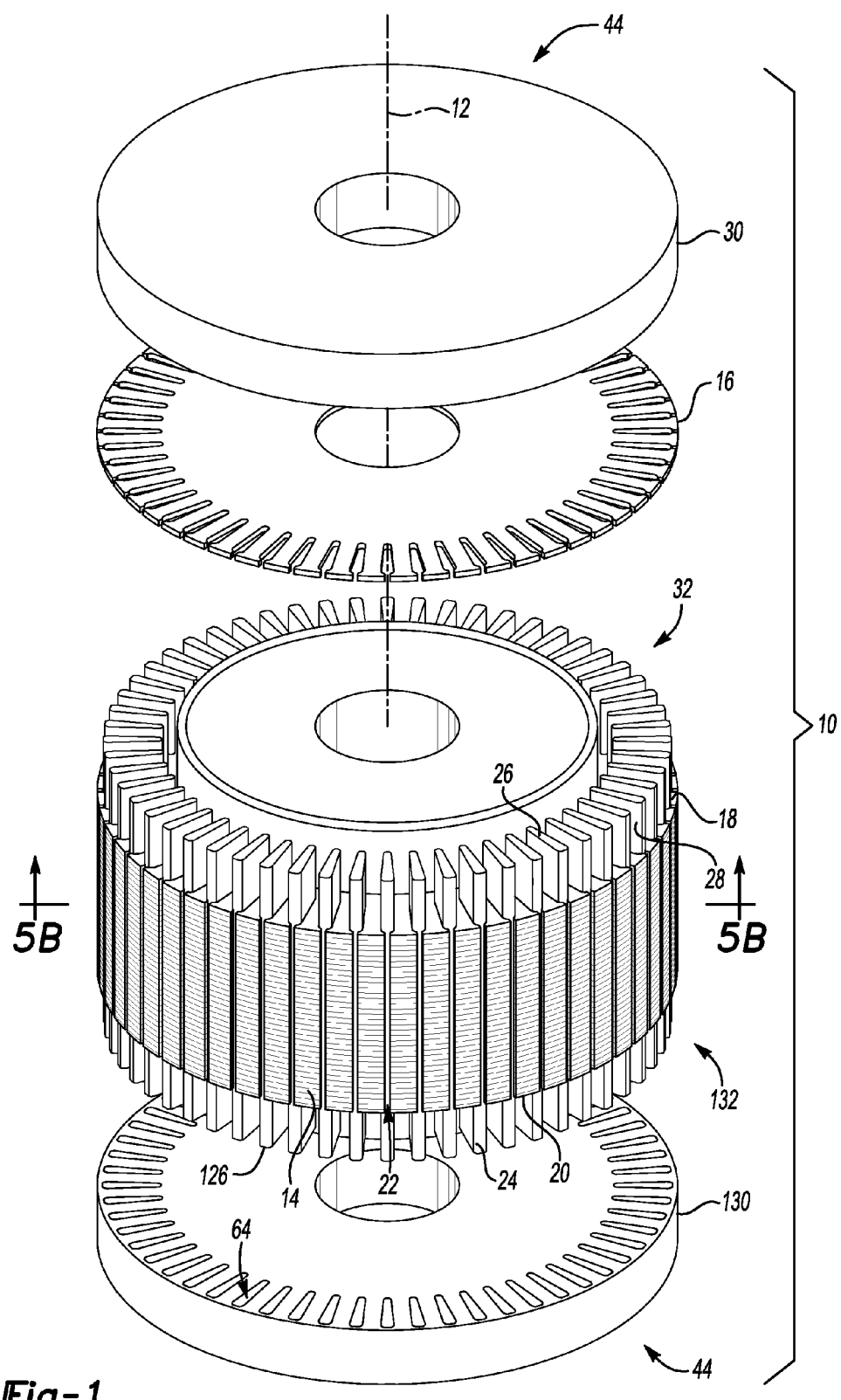
FIG. 1 is a schematic illustration of an exploded perspective view of a rotor.

Referring to the Figures, wherein like reference numerals refer to like elements, a rotor is shown at 10 in FIG. 1. The rotor 10 may be useful as a component of an electromagnetic machine (not shown) for automotive applications, e.g., as a component of an alternating current induction motor for a vehicle. However, the rotor 10 may also be useful for non-automotive applications, including as a component of a generator or electric motor for residential and commercial applications. By way of general explanation and described with reference to FIG. 1, the rotor 10 may be rotatable about an axis of rotation 12 and may rotate with respect to a stationary stator (not shown) of the electromagnetic machine.

The rotor 10 includes a lamination stack 14 formed from a plurality of steel laminations 16. More specifically, each of the plurality of steel laminations 16 may be an individual annular layer of, for example, silicon steel, and may be stacked adjacent another one of the plurality of steel laminations 16 to form the lamination stack 14.

Figure 3:
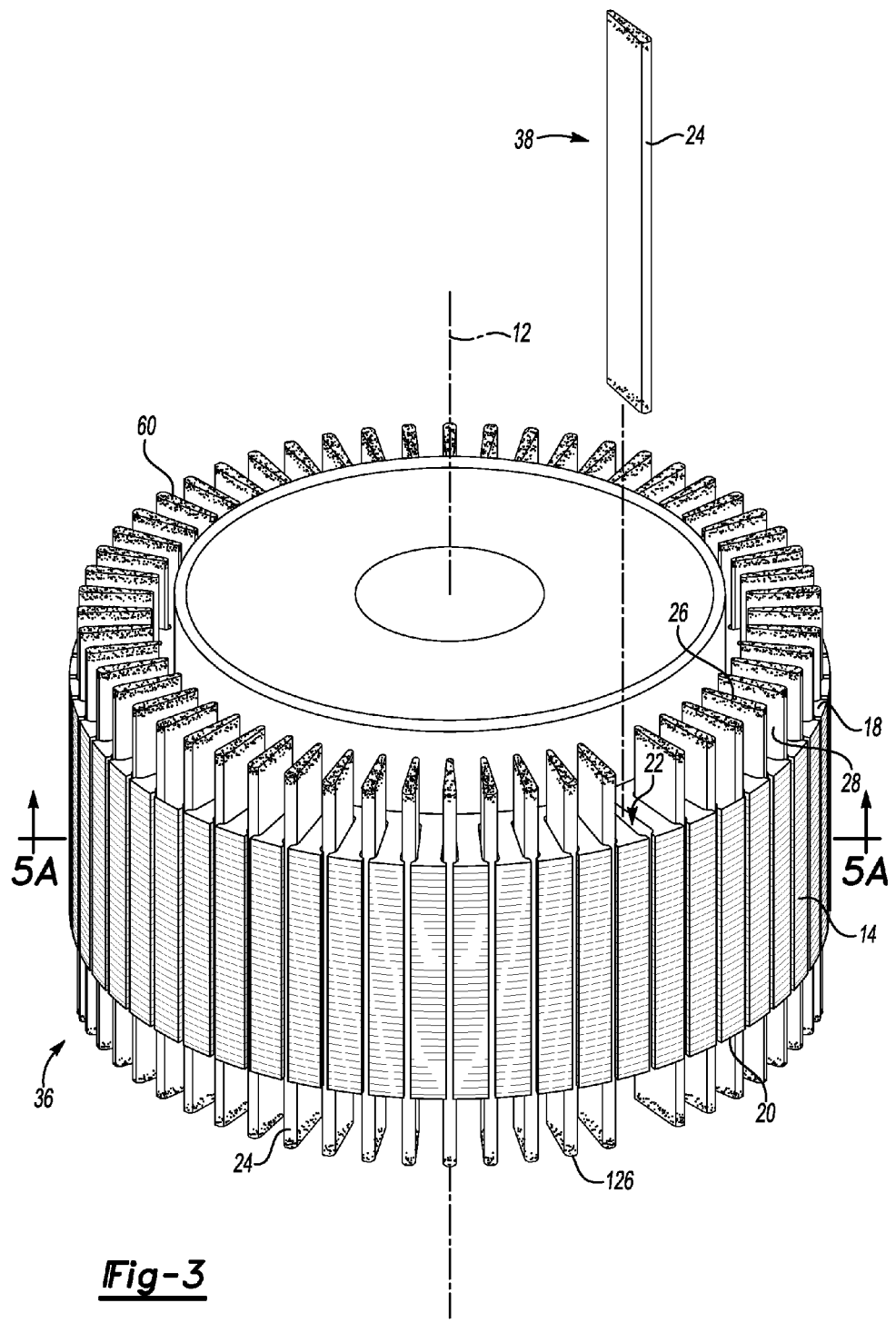
FIG. 3 is a schematic illustration of a perspective view of a plurality of conductor bars inserted into a lamination stack in preparation for forming the rotor of FIG. 1.

Further, as best shown in FIG. 3, the lamination stack 14 may have a proximal surface 18 and a distal surface 20 spaced apart from the proximal surface 18, and may define a slot 22 therethrough extending from the proximal surface 18 to the distal surface 20. That is, when the plurality of steel laminations 16 are stacked adjacent one another, each individual steel lamination 16 may align with every other individual steel lamination 16 to define the slot 22. Generally, the lamination stack 14 may define a plurality of slots 22 spaced about a periphery of the lamination stack 14. The plurality of slots 22 may extend through the lamination stack 14 substantially parallel to the axis of rotation 12 and may each be configured to receive a conductor bar 24. Although not shown, the plurality of slots 22 may also be arranged in a skewed configuration about the axis of rotation 12.

Therefore, referring again to FIG. 1, the rotor 10 includes the conductor bar 24 having two end portions 26, 126 each disposed opposite one another. The conductor bar 24 is disposed adjacent and in direct contact with the lamination stack 14 within the slot 22. That is, the conductor bar 24 directly abuts the lamination stack 14 within the slot 22 and is not separated from the lamination stack 14 by, for example, a layer of varnish, a coating, a resin, and/or a separator. More specifically, the conductor bar 24 may have a plurality of external surfaces 28 (FIG. 4B), and each of the plurality of external surfaces 28 may directly contact the lamination stack 14 within the slot 22.

Generally, the rotor 10 may include a plurality of conductor bars 24 each disposed within a respective one of the plurality of slots 22 so that a first end portion 26 of each of the plurality of conductor bars 24 extends from the proximal surface 18 of the lamination stack 14 and a second end portion 126 of each of the plurality of conductor bars 24 extends from the distal surface 20 of the lamination stack 14. For example, the rotor 10 may include from about 30 to about 100 conductor bars 24 spaced about the axis of rotation 12. Each conductor bar 24 may be configured to conduct electrical current during operation of the electromagnetic machine (not shown), and may therefore be formed from an electrically-conductive material. For example, each conductor bar 24 may be formed from copper or a copper alloy, such as a copper nickel alloy or a copper boron alloy. Advantageously, the conductor bar 24 may be formed from an electrolytic tough pitch copper alloy, such as C11000 copper alloy, so that the rotor 10 is economical to manufacture. As used herein, the terminology "electrolytic tough pitch copper alloy" refers to a copper alloy including oxygen in an amount of from about 0.02 parts by weight to about 0.04 parts by weight based on 100 parts by weight of the copper alloy. Alternatively, the conductor bar 24 may be formed from an oxygen-free copper alloy, such as C102 copper alloy. As used herein, the terminology "oxygen-free copper alloy" refers to a copper alloy including oxygen in an amount of about 0.001 parts by weight based on 100 parts by weight of the copper alloy.

Further, referring again to FIG. 1, each conductor bar 24 may terminate at and connect with a shorting ring 30 at a terminus 32 of the rotor 10. More specifically, the rotor 10 may include two shorting rings 30, 130, e.g., one shorting ring 30, 130, disposed at each respective terminus 32, 132 of the rotor 10. The shorting rings 30, 130 may electrically connect each of the plurality of conductor bars 24 to one another. Therefore, the shorting rings 30, 130 may also be formed from an electrically-conductive material, such as, but not limited to, copper, a copper alloy, aluminum, and/or an aluminum alloy.

Referring now to FIG. 2, in one embodiment, a method 34, 134, 234, 334, 434, 534 of forming the rotor 10 includes stacking 36 the plurality of steel laminations 16 adjacent and in contact with one another to form the lamination stack 14. That is, as set forth above and described with reference to FIG. 3, stacking 36 may include forming the lamination stack 14 having the proximal surface 18 and the distal surface 20, and defining the slot 22 through the lamination stack 14 that extends from the proximal surface 18 to the distal surface 20. The plurality of steel laminations 16 may be stacked adjacent one another via any process. By way of a non-limiting example, each steel lamination 16 may first be individually stamped and then subsequently stacked and pressed adjacent another steel lamination 16 using a mandrel to form the lamination stack 14.

With continued reference to FIG. 3, the method 34, 134, 234, 334, 434, 534 also includes inserting 38 the conductor bar 24 into the slot 22 defined by the lamination stack 14 to define a gap 40 (FIG. 5A) between the conductor bar 24 and the lamination stack 14. That is, inserting 38 may include spacing the conductor bar 24 apart from the lamination stack 14 by a distance 42 (FIG. 5A) within the slot 22. The conductor bar 24 may be manually inserted into the slot 22 by hand, or the conductor bar 24 may be inserted into the slot 22 by an automated process or machine. After inserting 38, the first end portion 26 of the conductor bar 24 may extend past the proximal surface 18 and the second end portion 126 may extend past the distal surface 20. Although not shown, the method 34 may also include cleaning the end portions 26, 126 of the conductor bar 24 in preparation for further assembly or formation of the rotor 10.

Figure 5A:
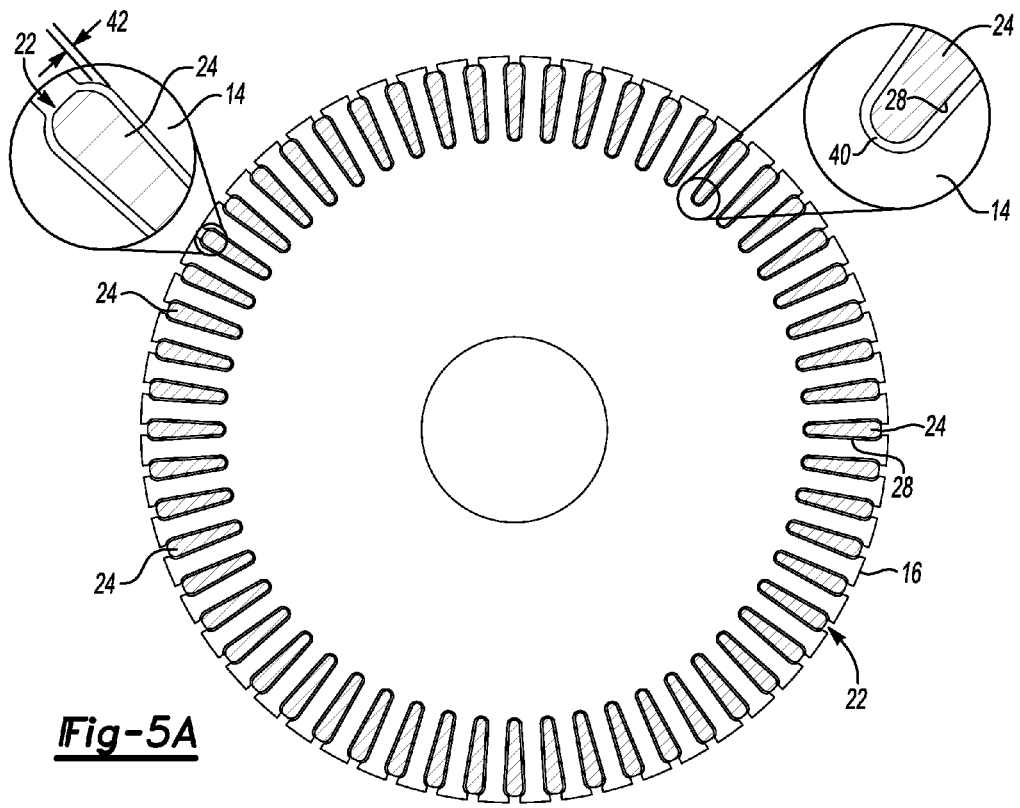
FIG. 5A is a schematic illustration of a cross-sectional view of the lamination stack and conductor bars of FIG. 3, taken along section lines 5A-5A.

Referring now to FIG. 5A, the gap 40 may be defined between at least a portion of the conductor bar 24, e.g., one or more external surface 28 of the conductor bar 24, and the lamination stack 14. That is, after inserting 38, the conductor bar 24 may only fit loosely within the slot 22 and consequently define the gap 40. Stated differently, the conductor bar 24 does not fit snugly within the slot 22 after inserting 38 and does not directly abut the lamination stack 14 within the slot 22.

The method 34, 134, 234, 334, 434, 534 may also include forming 44 the one or more shorting rings 30, 130 disposed adjacent and in contact with the conductor bar 24 as shown in FIG. 1. For example, the one or more shorting rings 30, 130 may define a plurality of cavities 64 therein such that the one or more shorting rings 30, 130 may surround a respective end portion 26, 126 of the conductor bar 24. Therefore, the lamination stack 14 may be sandwiched between two shorting rings 30, 130, wherein each end portion 26, 126 of each of the plurality of conductor bars 24 is disposed within a respective one of a plurality of cavities 64.

The one or more shorting rings 30, 130 may be formed in any manner. For example, the one or more shorting rings 30, 130 may each be formed separately, and then subsequently welded, brazed, or soldered onto the end portions 26, 126 of the conductor bar 24. Alternatively, the one or more shorting rings 30, 130 may be overcast onto the end portions 26, 126 and may be formed from, for example, an aluminum alloy. In other non-limiting examples, the one or more shorting rings 30, 130 may be pressure cast, gravity cast, or die cast over the end portions 26, 126 of the conductor bar 24.

Figure 5B:
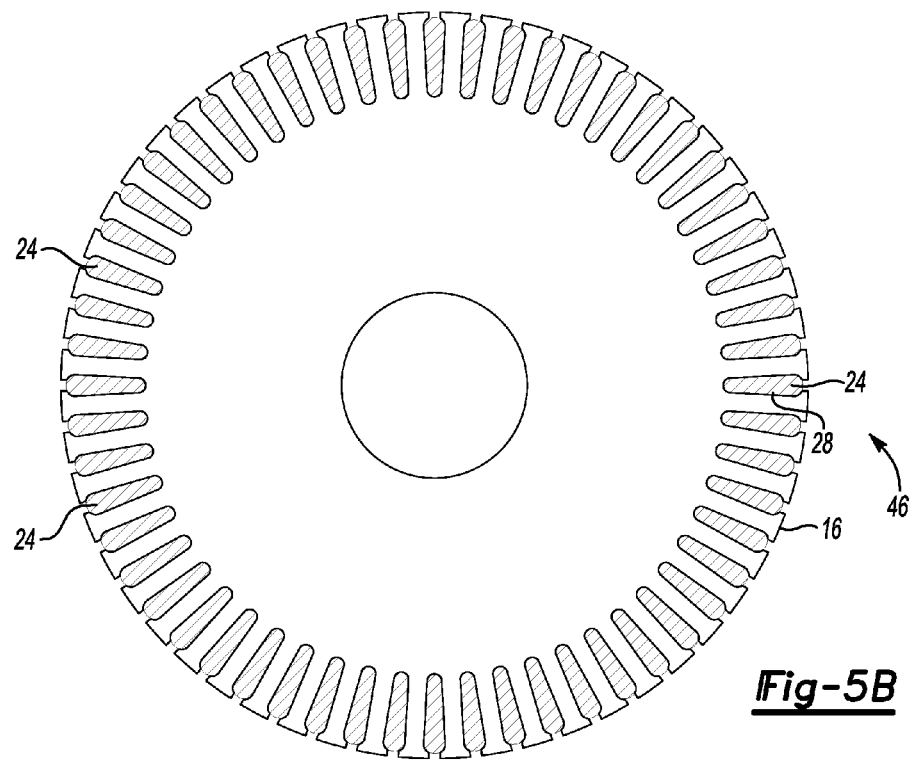
FIG. 5B is a schematic illustration of a cross-sectional view of the rotor of FIG. 1, taken along section lines 5B-5B.

Referring again to the method 34, 134, 234, 334, 434, 534 as described with reference to FIGS. 4A-5B, the method 34, 134, 234, 334, 434, 534 also includes, after inserting 38, swelling 46 (FIG. 5B) or expanding the conductor bar 24 to fill or close the gap 40 (FIG. 5A) and form the rotor 10. That is, as best shown in FIG. 5B, swelling 46 or expanding may include disposing the conductor bar 24 adjacent and in direct contact with the lamination stack 14 to close the gap 40. In other words, swelling 46 may include minimizing and/or eliminating the distance 42 (FIG. 5A) between the conductor bar 24 and the lamination stack 14 within the slot 22 such that the external surfaces 28 of the conductor bar 24 directly contact or abut the lamination stack 14. More specifically, only the conductor bar 24 may be disposed within the slot 22, and no other material or component may be sandwiched between the conductor bar 24 and the lamination stack 14. For example, the rotor 10 may be free from any resin, laminate, varnish, lacquer, coating, layer, and the like disposed between the conductor bar 24 and the lamination stack 14 within the slot 22. Therefore, the conductor bar 24 may have an initial volume (represented generally at 48 in FIG. 4A) before inserting 38. Swelling 46 may include heating (represented generally at 50 in FIG. 4A) the conductor bar 24 to expand the initial volume 48 to a final volume (represented generally at 52 in FIG. 4B) that is greater than the initial volume 48 such that the conductor bar 24 directly contacts the lamination stack 14 within the slot 22. As such, the gap 40 disappears after swelling 46.

One non-limiting example of swelling 46 includes irradiating a copper nickel alloy with a plurality of fission neutrons (not shown) at a dose of from about 20 displacements per atom (dpa) to about 70 dpa, e.g., about 30 dpa, to induce and subsequently aggregate a plurality of helium gas bubbles within the copper nickel alloy.

In another non-limiting example, swelling 46 includes increasing a volume or size of each of a plurality of particles of a copper powder or copper alloy powder. For example, swelling 46 may include heating 50 the copper powder or copper alloy powder to a temperature of from about 300° C. to about 500° C. in an atmosphere including hydrogen in an amount of from about 2 parts by volume to about 100 parts by volume.

In a further non-limiting example described with reference to FIG. 4A, the method 34, 134, 234, 334, 434, 534 may include diffusing 54 hydrogen gas 56 into the conductor bar 24 in preparation for swelling 46 the conductor bar 24. More specifically, diffusing 54 may include heating 50 the conductor bar 24 at a temperature of from about 100° C. to about 800° C. for a duration of from about 1 hour to about 20 days in an atmosphere including hydrogen in an amount of from about 2 parts by volume to about 100 parts by volume based on 100 parts by volume of the atmosphere. For example, diffusing 54 may include heating 50 the conductor bar 24 at a temperature of from about 300° C. to about 600° C. for a duration of from about 5 hours to about 10 days in an atmosphere including hydrogen in an amount of from about 20 parts by volume to about 80 parts by volume based on 100 parts by volume of the atmosphere. In another non-limiting example, diffusing 54 may include heating 50 the conductor bar 24 at a temperature of about 450° C. for a duration of from about 7 days to about 15 days in an atmosphere including hydrogen in an amount of from about 50 parts by volume to about 70 parts by volume based on 100 parts by volume of the atmosphere. The temperature and duration of heating 50 may be selected according to the type of copper alloy, an amount of oxygen present in the copper alloy, and/or a grain size of the copper alloy. For example, it may be advantageous to select a copper alloy such as C11000 copper alloy or C10200 copper alloy having a comparatively high quantity of grain boundaries and/or nucleation sites as compared to other copper alloys for formation of the conductor bar 24. Similarly, when a copper alloy having a comparatively small grain size, e.g., about 60 microns, wherein 1 micron is equal to $1 \times 10^{-6}$ m, is selected, diffusing 54 may occur at a comparatively high temperature, e.g., about 500° C., and the duration of heating 50 may be shortened.

Without intending to be limited by theory, diffusing 54 hydrogen gas 56 into the conductor bar 24 may initiate growth of a plurality of steam bubbles (not shown) within the conductor bar 24 and may initiate gas-induced swelling 46 of the conductor bar 24. In particular, diffusing 54 may nucleate or initiate the formation of a plurality of steam bubbles on one or more of the grain boundaries of the copper alloy. For example, any oxide dispersant, such as cuprous oxide, that is present in the copper alloy may react with the hydrogen gas 56 to form steam bubbles within the copper alloy along the grain boundaries. Such steam bubbles may generally have a surface having a dimension measured in microns. As the conductor bar 24 is heated during or subsequent to diffusing 54, each individual steam bubble may aggregate or combine with other steam bubbles to form comparatively larger steam bubbles each having a comparatively larger volume to thereby swell the conductor bar 24.

Diffusing 54 may occur before inserting 38 the conductor bar 24 into the slot 22 or after inserting 38 the conductor bar 24 into the slot 22. For example, in one embodiment described with reference to FIG. 2B, inserting 38 may be subsequent to diffusing 54. Stated differently, the conductor bar 24 may be disposed in the atmosphere including hydrogen prior to inserting 38 the conductor bar 24 into the slot 22. However, for this embodiment, diffusing 54 does not include concurrently heating 50 the conductor bar 24. Rather, diffusing 54 includes only nucleating or implanting the plurality of steam bubbles along the plurality of grain boundaries within the copper alloy without concurrently heating 50 the copper alloy to aggregate or combine the plurality of steam bubbles. More specifically, diffusing 54 may include exposing the conductor bar 24 to an atmosphere including hydrogen in an amount of from about 2 parts by volume to about 100 parts by volume, e.g., about 10 parts by volume or about 15 parts by volume or about 20 parts by volume, based on 100 parts by volume of the atmosphere.

Figure 2A:
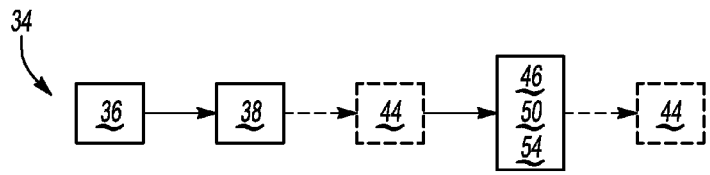
FIG. 2A is a schematic flowchart of a method of forming the rotor of FIG. 1.
Figure 2B:
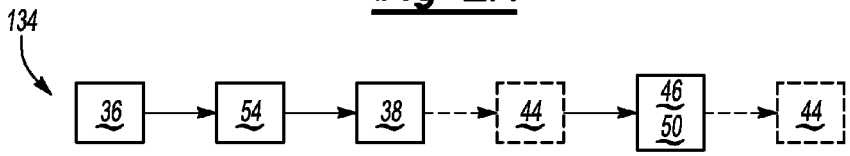
FIG. 2B is a schematic flowchart of a second embodiment of the method of FIG. 2A.
Figure 2C:
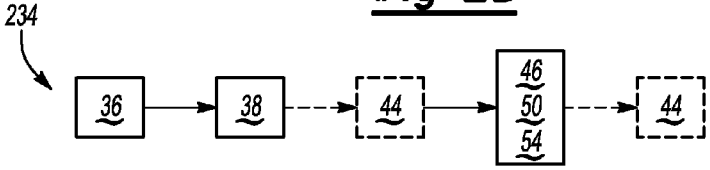
FIG. 2C is a schematic flowchart of a third embodiment of the method of FIG. 2A.
Figure 2D:
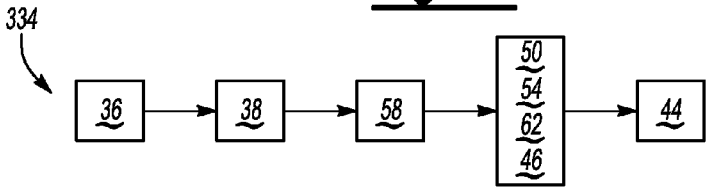
FIG. 2D is a schematic flowchart of a fourth embodiment of the method of FIG. 2A.

In another embodiment described with reference to FIGS. 2A, 2C, and 2D, diffusing 54 may include concurrently heating 50 the conductor bar 24. For this embodiment, diffusing 54 is concurrent to swelling 46. That is, heating 50 during swelling 46 may aggregate or combine the plurality of steam bubbles to form comparatively larger steam bubbles (not shown) and thereby swell the conductor bar 24 from the initial volume 48 (FIG. 4A) to the final volume 52 (FIG. 4B). In particular, diffusing 54 may include heating 50 the conductor bar 24 to a temperature of from about 250° C. to about 750° C., e.g., to about 300° C. or about 350° C. or about 400° C. or about 450° C. or about 475° C. or about 500° C. or about 525° C. or about 550° C. or about 575° C. or about 600° C. or about 650° C. or about 700° C. In one non-limiting example, diffusing 54 may include heating 50 the conductor bar 24 at a temperature of from about 400° C. to about 500° C. for a duration of from about 1.5 hours to about 200 hours, e.g., about 2 hours or about 10 hours or about 20 hours or about 48 hours or about 100 hours, in an atmosphere including hydrogen in an amount of about 10 parts by volume based on 100 parts by volume of the atmosphere. The atmosphere may also include an inert gas, e.g., argon, in an amount of from about 10 parts by volume to about 98 parts by volume, or about 90 parts by volume, based on 100 parts by volume of the atmosphere.

Referring again to the method 34, 134, 234, 334, 434, 534, swelling 46 may also occur prior or subsequent to forming 44 the shorting ring 30. That is, referring to FIGS. 2D-2F, swelling 46 may occur before forming 44 the shorting ring 30 on the end portion 26 of the conductor bar 24. Swelling 46 before forming 44 the shorting ring 30 presents the conductor bar 24 and end portion 26 in final swollen form such that the conductor bar 24 has the final volume 52 (FIG. 4B). The shorting ring 30 may then be formed as set forth above, e.g., via overmolding or casting, to surround the swollen end portion 26 of the conductor bar 24. Alternatively, referring to FIGS. 2A-2C, swelling 46 may occur after forming 44 the shorting ring 30 on the end portion 26 of the conductor bar 24. Swelling 46 after forming 44 the shorting ring 30 may eliminate any spacing (not shown) remaining between the shorting ring 30 and the end portion 26 of the conductor bar 24 and may enable an excellent mechanical and/or chemical interlock between the end portion 26 and the shorting ring 30.

Referring again to FIGS. 2D-2F, in another embodiment, the method 34 includes, after inserting 38 the conductor bar 24 into the slot 22 defined by the lamination stack 14, applying 58 a flux material (shown generally at 60 in FIG. 3) to the end portion 26. Applying 58 may include depositing the flux material 60 onto the end portion 26 of the conductor bar 24 before forming 44 the shorting ring 30. The flux material 60 may be provided, for example, in liquid, paste, or powder form (represented generally in FIG. 3), may be provided in an annular ring or wire form (not shown), or may be provided in sheet or shim form (not shown). As such, the flux material 60 may be brushed, dipped, or sprayed onto the end portion 26 of the conductor bar 24, may be disposed in a continuous ring along the end portion 26 of each of the plurality of conductor bars 24, or may be placed atop the end portion 26 of each conductor bar 24.

Non-limiting examples of suitable flux materials 60 include cesium tetrafluoroaluminate, cesium fluoroaluminate complex, potassium fluoroaluminates, potassium tetrafluoroaluminate, potassium penta-fluoroaluminate hydrate, potassium penta-fluoroaluminate hydrate-free, and combinations thereof.

For this embodiment, the method 334, 434, 534 further includes, after applying 58 the flux material 60, pre-heating 62 the flux material 60. Pre-heating 62 may include, for example, warming the flux material 60 in an industrial oven or an induction heating apparatus. Such pre-heating 62 may promote integrity between a mechanical and/or chemical interlock formed between the end portion 26 and the shorting ring 30. Depending upon a selection of the flux material 60, pre-heating 62 may include increasing a temperature of the flux material 60 to, for example, from about 150° C. to about 250° F. for a duration of from about 0.5 hours to about 1 hour.

Figure 2E:
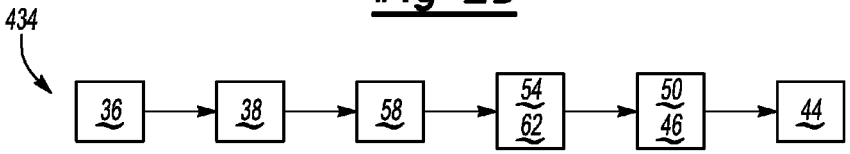
FIG. 2E is a schematic flowchart of a fifth embodiment of the method of FIG. 2A.

For some embodiments of the method 334, 434, 534 as described with reference to FIGS. 2D and 2E, diffusing 54 may be concurrent to pre-heating 62. That is, diffusing 54 may include both exposing the conductor bar 24 to the atmosphere including hydrogen and increasing a temperature of the conductor bar 24 as a result of pre-heating 62 the flux material 60. Diffusing 54 and pre-heating 62 may occur simultaneously such that the temperature increase required for pre-heating 62 the flux material 60 both nucleates or implants the plurality of steam bubbles along the plurality of grain boundaries within the copper alloy and heats the plurality of steam bubbles to aggregate or combine the plurality of steam bubbles. More specifically, diffusing 54 may include both heating 50 the conductor bar 24 and exposing the conductor bar 24 to an atmosphere including hydrogen in an amount of from about 2 parts by volume to about 100 parts by volume, e.g., about 10 parts by volume or about 15 parts by volume or about 20 parts by volume or about 25 parts by volume or about 30 parts by volume or about 35 parts by volume or about 40 parts by volume or about 45 parts by volume or about 50 parts by volume or about 55 parts by volume or about 60 parts by volume or about 65 parts by volume or about 70 parts by volume or about 75 parts by volume or about 80 parts by volume or about 85 parts by volume or about 90 parts by volume or about 95 parts by volume, based on 100 parts by volume of the atmosphere.

Figure 2F:
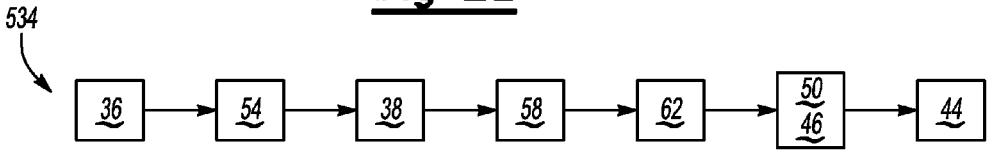
FIG. 2F is a schematic flowchart of a sixth embodiment of the method of FIG. 2A.

Alternatively, referring to FIG. 2F, diffusing 54 and pre-heating 62 may occur prior to swelling 46. Therefore, pre-heating 62 may only initiate or nucleate the plurality of steam bubbles along the grain boundaries, but may not grow or aggregate the plurality of steam bubbles. As described with reference to FIGS. 4A and 4B, only subsequent heating 50 during swelling 46 may then aggregate or combine the plurality of steam bubbles to form comparatively larger steam bubbles (not shown) and thereby swell the conductor bar 24 from the initial volume 48 to the final volume 52. For example, subsequent swelling 46 may include heating 50 the conductor bar 24 at a temperature of from about 100° C. to about 800° C. for a duration of from about 1 hour to about 20 days in an atmosphere including hydrogen in an amount of from about 2 parts by volume to about 100 parts by volume based on 100 parts by volume of the atmosphere.

Alternatively, in yet another embodiment described with reference to FIG. 2F, diffusing 54 may be prior to inserting 38. That is, diffusing 54 hydrogen gas 56 (FIG. 4A) into the conductor bar 24 may occur before inserting 38 the conductor bar 24 into the slot 22, and may occur, for example, prior to increasing a temperature of the conductor bar 24 during pre-heating 62 or during swelling 46. That is, diffusing 54 may only include nucleating or initiating formation of the plurality of steam bubbles without aggregating or growing the plurality of steam bubbles. More specifically, for this embodiment, diffusing 54 may include exposing the conductor bar 24 to an atmosphere including hydrogen in an amount of from about 2 parts by volume to about 100 parts by volume, without heating 50 or pre-heating 62 the conductor bar 24. Subsequent swelling 46 may then include heating 50 the conductor bar 24.

For embodiments including applying 58 the flux material 60, the method 334, 434, 534 further includes, after swelling 46, forming 44 the shorting ring 30 disposed in contact with the flux material 60. The shorting ring 30 may be formed separately, and then subsequently welded, brazed, or soldered onto the end portion 26 of the conductor bar 24 to chemically and/or mechanically join with the flux material 60 and the lamination stack 14. Alternatively, the shorting ring 30 may be overcast onto the flux material 60 disposed on the end portion 26 and may be formed from, for example, an aluminum alloy. In other non-limiting examples, the shorting ring 30 may be pressure cast, gravity cast, or die cast over the flux material 60 disposed on the end portion 26 of the conductor bar 24.

Further, the method 34, 134, 234, 334, 434, 534 may also include optimizing parameters such as the number of nucleation sites present in the conductor bar 24, the size of the plurality of steam bubbles, the duration of heating 50, the temperature, and/or the grain boundary size of the copper or copper alloy. For example, the method 34 may include determining a relationship between the grain boundary size, the duration of heating 50, and the temperature.

As such, the method 34, 134, 234, 334, 434, 534 provides rotors 10 having excellent structural integrity and balance during rotation. In particular, rotors 10 formed by the method 34, 134, 234, 334, 434, 534 are substantially free from vibration, rattle, and/or stress during rotation which may otherwise be caused by a non-closed gap 40 (FIG. 5A) between the conductor bar 24 and the lamination stack 14. Rather, after swelling 46, the conductor bar 24 abuts and directly contacts the lamination stack 14 so that the gap 40 is substantially eliminated. That is, the formed rotors 10 do not define the gap 40 between the lamination stack 14 and the conductor bar 24. In addition, the rotors 10 are economical to manufacture and operate since the method 34, 134, 234, 334, 434, 534 does not include swaging, varnishing, or laminating the conductor bars 24.

In addition, rotors 10 formed by the method 34, 134, 234, 334, 434, 534 exhibit excellent electrical conductivity and efficiency during operation which may be attributed to direct contact between the end portion 26 of each conductor bar 24 and the shorting ring 30. In particular, the method 34, 134, 234, 334, 434, 534 forms a strong joint between the plurality of conductor bars 24 and the shorting ring 30 that can adequately withstand inertial forces during rotor operation. As such, rotors 10 formed by the method 34, 134, 234, 334, 434, 534 are useful for applications requiring electromagnetic devices (not shown) having excellent power density.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a rotor, the method comprising:
   inserting a conductor bar into a slot defined by a lamination stack to define a gap between the conductor bar and the lamination stack;
   after inserting, expanding the conductor bar within the slot to fill the gap and form the rotor; and
   diffusing hydrogen gas into the conductor bar;
   wherein diffusing includes heating the conductor bar at a temperature of from about 100° C. to about 800° C. for a duration of from about 1 hour to about 20 days in an atmosphere including hydrogen in an amount of from about 2 parts by volume to about 100 parts by volume based on 100 parts by volume of the atmosphere.

2. The method of claim 1, wherein expanding includes disposing the conductor bar adjacent and in direct contact with the lamination stack.

3. The method of claim 1, wherein inserting includes spacing the conductor bar apart from the lamination stack by a distance within the slot, and further wherein expanding includes minimizing the distance.

4. The method of claim 1, wherein the conductor bar has an initial volume before inserting, and further wherein expanding includes heating the conductor bar to expand the initial volume to a final volume that is greater than the initial volume.

5. The method of claim 1, wherein diffusing is concurrent to expanding.

6. The method of claim 1, wherein inserting is subsequent to diffusing.

7. A method of forming a rotor, the method comprising:
   stacking a plurality of steel laminations adjacent and in contact with one another to form a lamination stack, wherein the lamination stack has a proximal surface and a distal surface spaced apart from the proximal surface and further wherein the lamination stack defines a slot therethrough extending from the proximal surface to the distal surface;
   diffusing hydrogen gas into the conductor bar;
   wherein diffusing includes exposing the conductor bar to an atmosphere including hydrogen in an amount of from about 2 parts by volume to about 20 parts by volume based on 100 parts by volume of the atmosphere;
   after diffusing, inserting a conductor bar having an end portion into the slot to define a gap between the conductor bar and the lamination stack;
   after inserting, applying a flux material to the end portion;
   after applying, pre-heating the flux material; and
   after inserting, expanding the conductor bar within the slot to fill the gap and form the rotor.

8. The method of claim 7, wherein expanding includes disposing the conductor bar adjacent and in direct contact with the lamination stack.

9. The method of claim 7, wherein inserting includes spacing the conductor bar apart from the lamination stack by a distance within the slot, and further wherein expanding includes minimizing the distance.

10. The method of claim 7, wherein the conductor bar has an initial volume before inserting, and further wherein expanding includes heating the conductor bar to expand the initial volume to a final volume that is greater than the initial volume.

11. The method of claim 7, further including, after expanding, forming a shorting ring disposed in contact with the flux material.

12. A method of forming a rotor, the method comprising:
   stacking a plurality of steel laminations adjacent and in contact with one another to form a lamination stack, wherein the lamination stack has a proximal surface and a distal surface spaced apart from the proximal surface and further wherein the lamination stack defines a slot therethrough extending from the proximal surface to the distal surface;
   diffusing hydrogen gas into the conductor bar;
   after diffusing, inserting a conductor bar having an end portion into the slot to define a gap between the conductor bar and the lamination stack;
   after inserting, applying a flux material to the end portion;
   after applying, pre-heating the flux material; and
   after inserting, expanding the conductor bar within the slot to fill the gap and form the rotor;
   wherein expanding includes heating the conductor bar at a temperature of from about 100° C. to about 800° C. for a duration of from about 1 hour to about 20 days in an atmosphere including hydrogen in an amount of from about 2 parts by volume to about 100 parts by volume based on 100 parts by volume of the atmosphere.

* * * * *